(12) United States Patent
Liu

(10) Patent No.: US 12,414,164 B2
(45) Date of Patent: Sep. 9, 2025

(54) RANDOM ACCESS METHOD, DEVICE, AND MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 366 days.

(21) Appl. No.: 17/631,387

(22) PCT Filed: Jul. 31, 2019

(86) PCT No.: PCT/CN2019/098746
§ 371 (c)(1),
(2) Date: Jan. 28, 2022

(87) PCT Pub. No.: WO2021/016967
PCT Pub. Date: Feb. 4, 2021

(65) Prior Publication Data
US 2022/0330328 A1 Oct. 13, 2022

(51) Int. Cl.
H04W 74/0833 (2024.01)
H04W 56/00 (2009.01)
H04W 74/02 (2009.01)
H04W 74/08 (2009.01)

(52) U.S. Cl.
CPC ....... H04W 74/085 (2013.01); H04W 56/001 (2013.01); H04W 74/02 (2013.01); H04W 74/0866 (2013.01)

(58) Field of Classification Search
CPC .............................................. H04W 88/00–06
See application file for complete search history.

(56) References Cited

U.S. PATENT DOCUMENTS

| 2013/0170479 | A1* | 7/2013 | Fong ................. H04W 72/0446 370/336 |
| 2018/0279376 | A1* | 9/2018 | Dinan .................... H04W 52/50 |
| 2019/0261411 | A1* | 8/2019 | Chin ................. H04W 74/0833 |
| 2019/0335515 | A1* | 10/2019 | Chen ................ H04W 74/0858 |
| 2020/0052767 | A1* | 2/2020 | Wang ................ H04W 74/0833 |

(Continued)

FOREIGN PATENT DOCUMENTS

| CN | 108271275 A | 7/2018 |
| CN | 108282899 A | 7/2018 |

(Continued)

OTHER PUBLICATIONS

European Patent Application No. 19939132.7, Search and Opinion dated Aug. 1, 2022, 12 pages.

(Continued)

Primary Examiner — San Htun
(74) Attorney, Agent, or Firm — Cozen O'Connor

(57) ABSTRACT

A random access method, a device, and a medium. The random access method includes: receiving configuration information, the configuration information being used to instruct to enable a back-off function of a random access process; and switching from a two-step random access to a four-step random access by a back-off in response to a synchronization signal and PBCH block (SSB) based random access meeting a target condition.

17 Claims, 7 Drawing Sheets

(56) References Cited

U.S. PATENT DOCUMENTS

2020/0107369 A1* 4/2020 Jeon ................... H04W 74/006
2020/0252973 A1* 8/2020 Zhang ............... H04W 74/0833

FOREIGN PATENT DOCUMENTS

CN          108282901 A      7/2018
CN          109863814 A      6/2019

OTHER PUBLICATIONS

ZTE "Procedures and mgsB content [105bis#30][NR/2-step RACH]" 3GPP TSG-RAN WG2 Meeting #106, R2-1906308, May 2019, 91 pages, Best Available Date: May 13-17, 2019.

Samsung "Procedure for Two-step RACH" 3GPP TSG RAN WG1 #97, R1-1906906, May 2019, 8 pages, Best Available Date: May 13-17, 2019.

Vivo "Discussion on the MsgA resource selection" 3GPP TSG-RAN WG2 Meeting #106, R2-1905655, May 2019, 7 pages, Best Available Date: May 13-17, 2019.

PCT/CN2019/098746 International Search Report dated Apr. 16, 2020, 2 pages.

* cited by examiner

RANDOM ACCESS METHOD, DEVICE, AND MEDIUM

CROSS-REFERENCE TO RELATED APPLICATION

This application is a U.S. national phase of International Application No. PCT/CN2019/098746, filed with the State Intellectual Property Office of P. R. China on Jul. 31, 2019, the content of which is incorporated herein by reference in its entirety.

TECHNICAL FIELD

The disclosure relates to a field of communication technologies, and more particularly, to a random access method and apparatus, a device and a storage medium.

BACKGROUND

Standardization of a two-step random access has been developed in a $3^{rd}$ generation partnership project (3GPP). The two-step random access is a simplified version of a four-step random access. The two-step random access merely includes a message A (MsgA) sent by a terminal to a base station and a message B (MsgB) fed back by the base station to the terminal.

In the two-step random access process, a UE determines a downlink beam based on the best one of synchronization signal and PBCH blocks (SSBs) which is higher than a certain threshold (each SSB corresponding to a respective downlink beam), and determines a random access resource and a corresponding uplink resource based on the downlink beam. If all the SSBs are lower than the threshold, the UE randomly selects one SSB to determine the downlink beam, or selects the SSB with the highest signal quality to determine the downlink beam.

Due to underperformance by the aforementioned methods in tracking beam before initiating the access, the selected downlink beam may not be good enough, such that a success rate of the message A is reduced, which may affect access performance.

SUMMARY

The disclosure provides a random access method and apparatus, a device and a storage medium.

According to a first aspect of the embodiments of the disclosure, a random access method is provided. The method includes: receiving configuration information, in which the configuration information is configured to indicate to enable a back-off function of a random access process; and switching from a two-step random access to a four-step random access by a back-off in response to a synchronization signal and PBCH block (SSB) based random access meeting a target condition.

According to a second aspect of the embodiments of the disclosure, a random access method is provided. The method includes: sending configuration information, in which the configuration information is configured to indicate to enable a back-off function of a random access process; and sending a synchronization signal and PBCH block (SSB), in which the SSB is configured to trigger a UE to switch from a two-step random access to a four-step random access by a back-off in response to a SSB based random access meeting a target condition.

According to a third aspect of the embodiments of the disclosure, a terminal is provided, and includes: a processor and a memory storing executable instructions thereon. The processor is configured to load and execute the executable instructions to perform the random access method according to any of the foregoing aspects.

According to a fourth aspect of the embodiments of the disclosure, an access network device is provided, and includes: a processor and a memory storing executable instructions thereon. The processor is configured to load and execute the executable instructions to perform the random access method according to any of the foregoing aspects.

It is to be understood that both the foregoing general description and the following detailed description are exemplary and explanatory only, and are not restrictive of the present disclosure, as claimed.

DETAILED DESCRIPTION

The embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The communication system and business scenarios described in the embodiments of the present disclosure are used to better explain the technical solutions of the present disclosure, but not constructed to limit the technical solutions of the present disclosure. It would be appreciated by those skilled in the art that with the evolution of communication system and the emergence of new business scenarios, the technical solutions of the present disclosure may also be suitable to similar technical problems.

Figure 1:
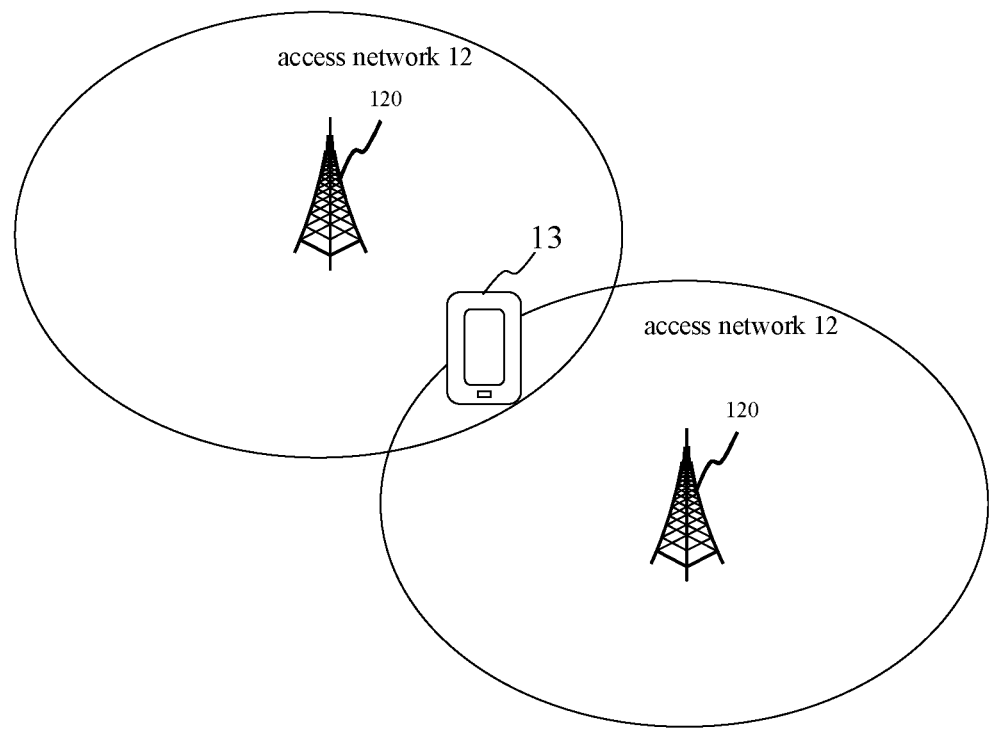
FIG. 1 is a schematic diagram illustrating a communication system according to an embodiment of the present disclosure.

FIG. 1 is a schematic diagram illustrating a communication system according to an embodiment of the present disclosure. As illustrated in FIG. 1, the communication system may include an access network 12 and a terminal 13.

The access network 12 includes several access network devices 120. The access network device 120 may be a base station, which is a device deployed in the access network to provide a wireless communication function for the terminal. The base station may include various types of base stations, such as a macro base station, a micro base station, a relay station, an access point, etc. In systems using different wireless access technologies, the device with the function of the base station may be designated differently, for example, eNodeB or eNB in the LTE system, gNodeB or gNB in the 5G NR-U system. With the evolution of communication technology, the designation "base station" may be changed. For ease of description, in the embodiments of the present disclosure, the above devices for providing the wireless communication function to the terminal 13 are collectively called "access network device". For example, the access network device 120 includes a source base station and a target base station.

The terminal 13 may include various forms of devices with the wireless communication function, such as a hand-held device, a vehicle-mounted device, a wearable device, a computing device or other processing devices connected to a Modem, and various forms of user equipment (UE), mobile station (MS), terminal device and so on. For ease of description, in the embodiments of the present disclosure, the above devices are collectively called "terminal". The access network device 120 and the terminal 13 communicate with each other through an air interface technology, such as via the Uu interface.

Synchronization Signal and PBCH Block (SSB)

The terminal may access to a cell by performing a cell searching process and a random access process after being powered on. In the NR-U system, the cell searching process is completed mainly based on detection of the downlink synchronization channel and signal. The terminal obtains a cell identification ID and achieves frequency synchronization and downlink time synchronization by the cell search process. The cell searching process further includes a primary synchronization signal (PSS) searching, a secondary synchronization signal (SSS) searching and a physical broadcast channel (PBCH) detection.

The downlink synchronization channel and signal includes many SS burst sets. Each SS burst set may include one or more SSBs, and each SSB includes transmission of the PSS, SSS and PBCH.

SS Burst Set

A design objective of the NR system is to support carrier frequencies of 0-100 GHz. However, when the system works in a millimeter wave (MMW) frequency band, a cell coverage needs to be provided by a beam forming technology. At same time, due to limit of hardware, the base station typically cannot transmit multiple beams simultaneously to cover the entire cell, such that a beam scanning technology is introduced to solve the problem of cell coverage.

Figure 2:
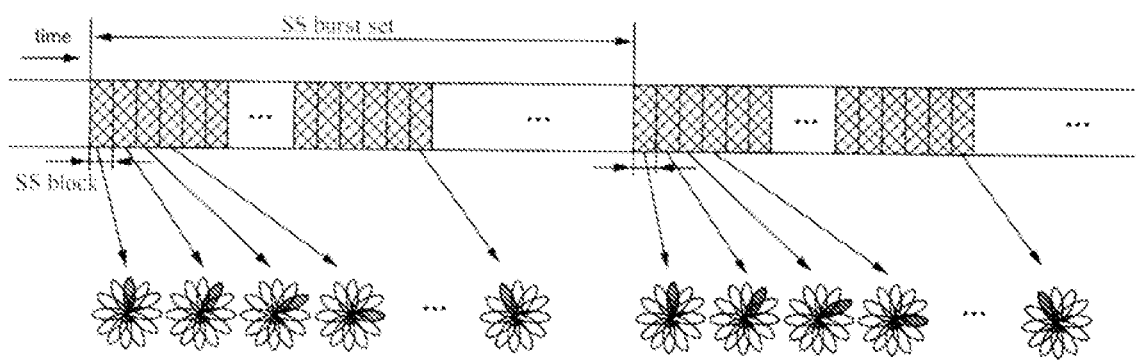
FIG. 2 is a schematic diagram illustrating a method for sending a SS (synchronization signal) burst set according to an embodiment.

The so called "beam scanning" refers to that the base station merely sends beams in one or more beam directions at a certain moment. By sending different beams at several time moments, all directions of the entire cell can be covered. The set of SSBs is designed for the beam scanning, and configured to transmit the PSS, SSS and PBCH (these signals form one SSB) required by the terminal to perform the cell searching process in various beam directions. The SS burst set is as set of many SSSBs within a certain time period, and each SSB corresponds to one beam direction in the same time period. The beam directions of respective SSBs in a single SSB may cover the entire cell. FIG. 2 illustrates a schematic diagram of a method of sending the SSBs in different beam directions at many time moments. It should be noted that, when the NR system works in the low frequency band without using the beam scanning technology, the usage of the SS burst set is still beneficial to improve the cell coverage, because more energy may be accumulated when the UE receives multiple SSBs of time division multiplexing (TDM) in the SS burst set. For example, one SS burst set is limited to a certain sub-frame of 5 ms, and starts from the $0^{th}$ time slot of the sub-frame.

Figure 3:
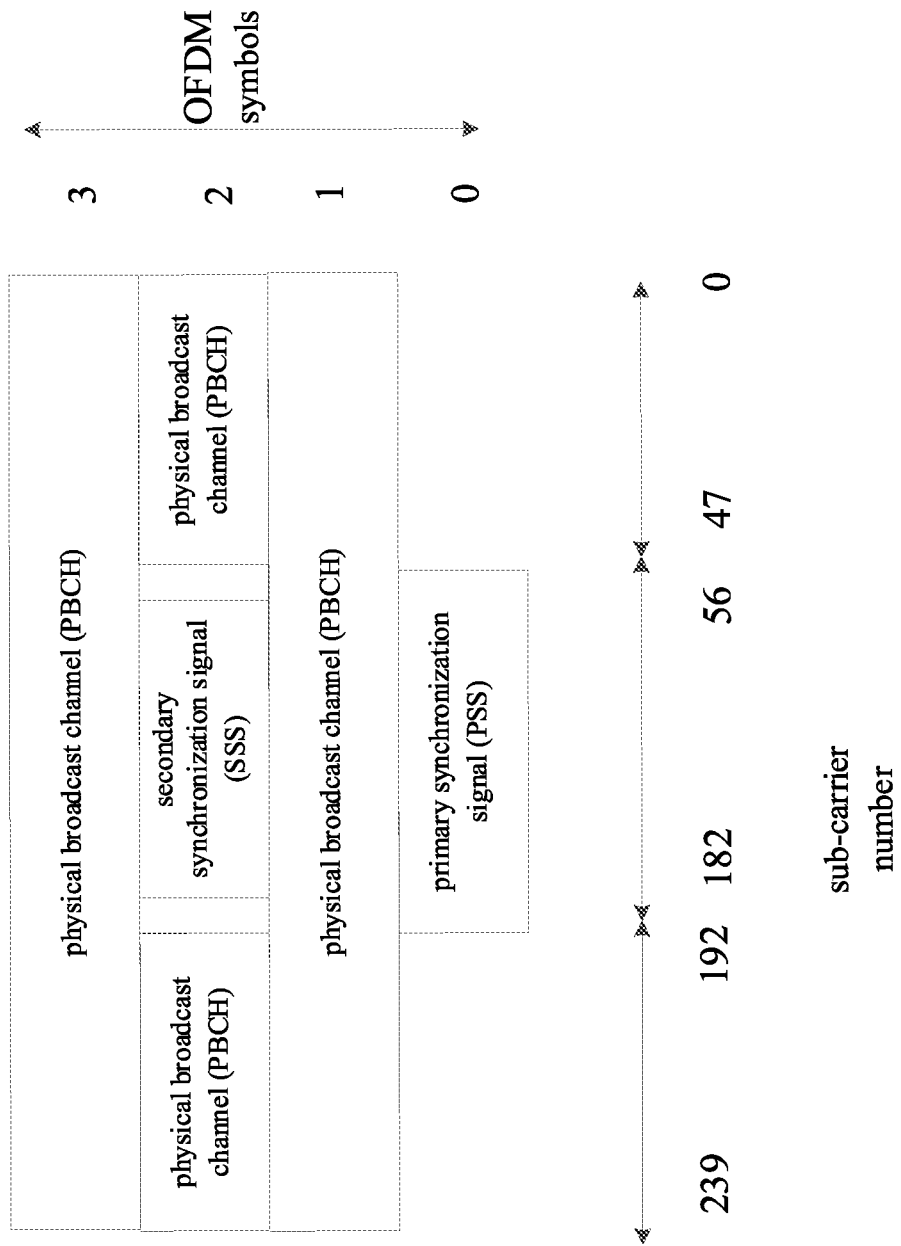
FIG. 3 is a schematic diagram illustrating an interface of the SSB according to an embodiment.

As illustrated in FIG. 3, the SSB occupies four orthogonal frequency division multiplexing (OFDM) symbols in time domain, which is indexed from 0 to 3 in the SSB. The SSB occupies a frequency domain width of twenty RBs in frequency domain, at most occupying 240 sub-carriers (each RB contains 12 sub-carriers). The indexes of RBs and the sub-carriers in the frequency domain may be indicated from 0 in an ascending order.

The UE firstly searches for the PSS. The PSS is a pseudorandom sequence having a length of 127 bits, for example a BPSK (Binary-Phase-Shift-Keying) m-sequence in the frequency domain. The PSS may be mapped to 127 continuous sub-carriers (from 56 to 182) in the 12 PRBs, occupying 144 sub-carriers with guard intervals at the two sides which do not transmit power. After the UE searches the PSS, a sub-carrier interval of she SSB can be obtained.

The SSS has the frequency domain similar to the PSS. The SSS may be mapped to 127 continuous sub-carriers in the 12 PRBs, occupying 144 sub-carriers. After the UE searches the SSS, a unique physical layer cell identification (ID) can be obtained.

After the UE obtained the physical layer cell identification by searching for the PSS/SSS, the PBCH may be demodulated. A demodulation reference signal position of the PBCH is required to demodulate the PBCH. The DMRS of the PBCH and the PBCH have the same position in the time domain, and have an interval of four sub-carriers in the frequency domain. An initial offset is determined by the physical layer cell identification.

After the UE obtains the SSB, some necessary system information is required to complete a resistance and an initial access of the cell. The necessary system information may be called as remaining minimum system information (RMSI) in the NR system. In some perspectives, the RMSI may be considers as a system information block type 1 (SIB1) message in the LTE system, the SIBI message is mainly transmitted by the PDSCH which is in turn scheduled by downlink control information (DCI) of the PDCCH. The UE needs to obtain the PDCCH information for scheduling the RMSI from a master information block (MIB), and performs a blind detection on the PDCCH to obtain the RMSI. The information in the MIB refers to a pdcch-ConfigSIB1 field. The MIB is obtained by the UE from the SSB.

For example, the UE may confirm whether a frequency-domain range of a current SSB contains a common control resource set (CORESET), i.e., whether a type0-PDCCH common search space is configured, based on a parameter ssb-SubcarrierOffset issued in the MIB, and thereby determines whether the RMSI is configured in the frequency domain of the current SSB of the cell. When the UE detects that the RMSI is not configured in the frequency domain of the current SSB of the cell under some conditions, the UE may detect whether the CORESET is provided in a type0-PDCCH common search space having a certain offset with the current SSB within a frequency-domain range of a next SSB based on the parameter pdcch-ConfigSIB1 contained in the MIB. If the UE still cannot detect the common CORESET, it can be considered that the cell is not configured with the RMSI, and the cell searching process of searching for a corresponding frequency point for a former frequency-locked SSB is abandoned.

The PDCCH and the PDSCH of "SSB+RMSI" can be defined as a discovery reference signal (DRS). The continuous transmission of the DRS lasts for 1 ms at most.

Random Access Process

The random access process refers to a process from sending by the UE a random access preamble to try to access a network to establishing a basic signaling connection between the network and the UE. The random access process is a basic requirement for any cellular communication system, configured to establish a data communication between the terminal and the network.

The random access process includes a four-step random access and a two-step random access.

Four-Step Random Access

Figure 4:
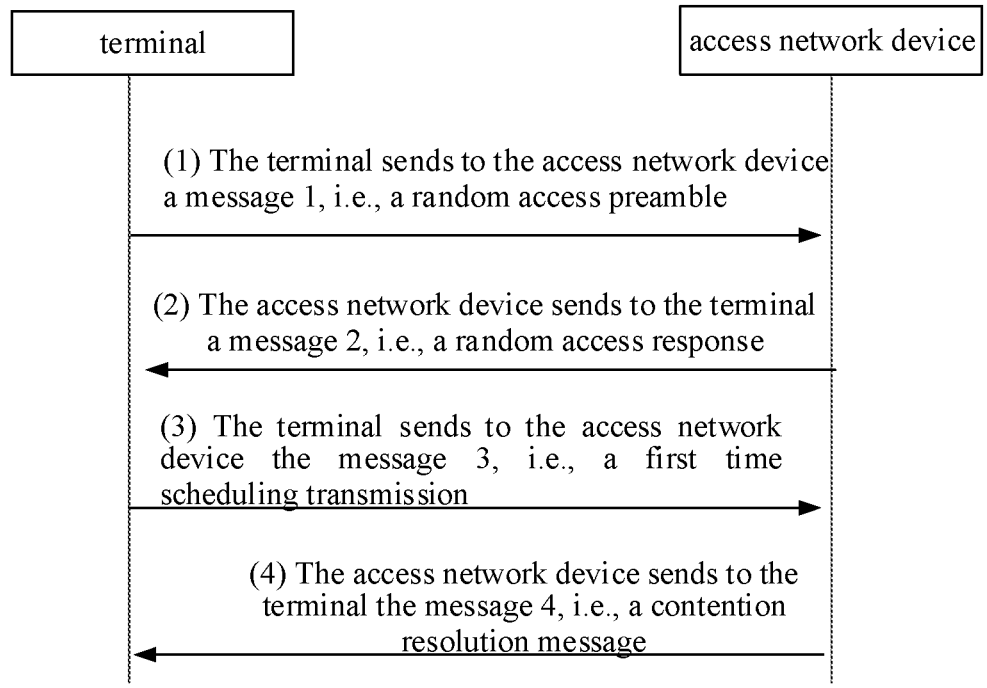
FIG. 4 is a flowchart illustrating a four-step random access according to another embodiment.

FIG. 4 is a schematic diagram illustrating the four-step random access in a contention-based random access process. The four-step random access includes the following.

(1) The terminal sends to the access network device a message 1, i.e., a random access preamble.

The terminal sends the random access preamble to the access network device, and the access network device estimates a transmission delay based on the random access preamble to realize uplink synchronization.

(2) The access network device sends to the terminal a message 2, i.e., a random access response (RAR).

The access network device sends a timing advance command based on the transmission delay obtained in the first step to adjust a transmitting time of the terminal. The message 2 is organized by a media access control (MAC) of the access network device and carried by a downlink share channel (DL SCH). One message 2 may simultaneously respond to random access requests from multiple terminals.

The access network device schedules the message 2 by the physical downlink control channel (PDCCH), and performs addressing (also referred to as scrambling) by a cell-radio network temporary identifier (C-RNTI) or a random access radio network temporary identifier (RA-RNTI). The RA-RNTI is determined by a time-frequency position of a physical random access channel (PRACH) carrying the message 1. The message 2 includes an uplink transmission timing advance, for assigning an uplink resource and a temporary C-RNTI to a message 3.

(3) The terminal sends to the access network device the message 3, i.e., a first time scheduling transmission.

After receiving the message 2, the terminal transmits the message 3 on the assigned uplink resource, and sends a user equipment identify (UE ID) to the access network device in a physical uplink share channel (PUSCH).

Alternatively, the message 3 includes a common control channel (CCCH) service data unit (SDU), used by a message 4 to carry a contention resolution identity.

(4) The access network device sends to the terminal the message 4, i.e., a contention resolution message.

The access network device sends the contention resolution message to the terminal in a physical downlink share channel (PDSCH).

Two-Step Random Access

Figure 5:
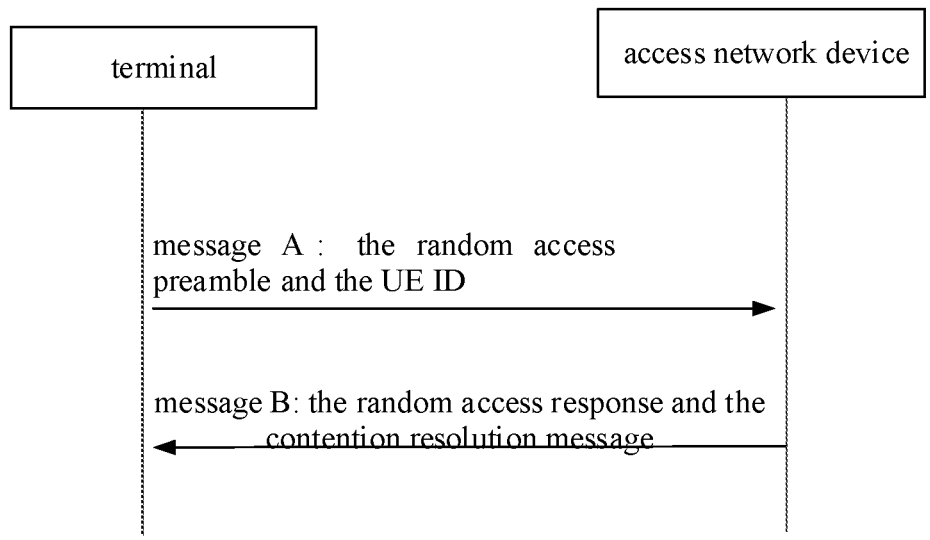
FIG. 5 is a flowchart illustrating a two-step random access according to another embodiment.

In the contention-based random access process, the four-step random access may be simplified as the two-step random access, with reference to FIG. 5. After simplification, the random access process includes a message A and a message B as follows.

(1) The terminal sends the message A to the access network device.

(2) The access network device sends the message B to the terminal after receiving the message A from the terminal.

Alternatively, the message A includes contents of the message 1 and the message 3, i.e., the message A includes the random access preamble and the UE ID, in which the UE ID may be one of the C-RNTI, the temporary C-RNTI, the RA-RNTI.

Alternatively, the message B includes contents of the message 2 and the message 4, i.e., the message B includes the random access response and the contention resolution message.

Since the UE may perform bad in tracking the downlink beam after the UE listens to the SSB, the beam selected when sending the random access preamble may be not good. In the four-step random access, the message 1 may have a relative good demodulation performance, i.e., the message has a high demodulation success probability, such that a success rate of the random access can be ensured. However, in the two-step random access, the PRACH and the PUSCH are both sent in the message A, since the demodulation performance of the PUSCH is poorer than that of the PRACH, the demodulation success rate of the message A is decreased, thus affecting the random access performance, particularly in the FR2 frequency band, which has a frequency range of 24.25-52.6 GHz, i.e., the millimeter wave (MMW) frequency band as known in the mobile communication field.

Figure 6:
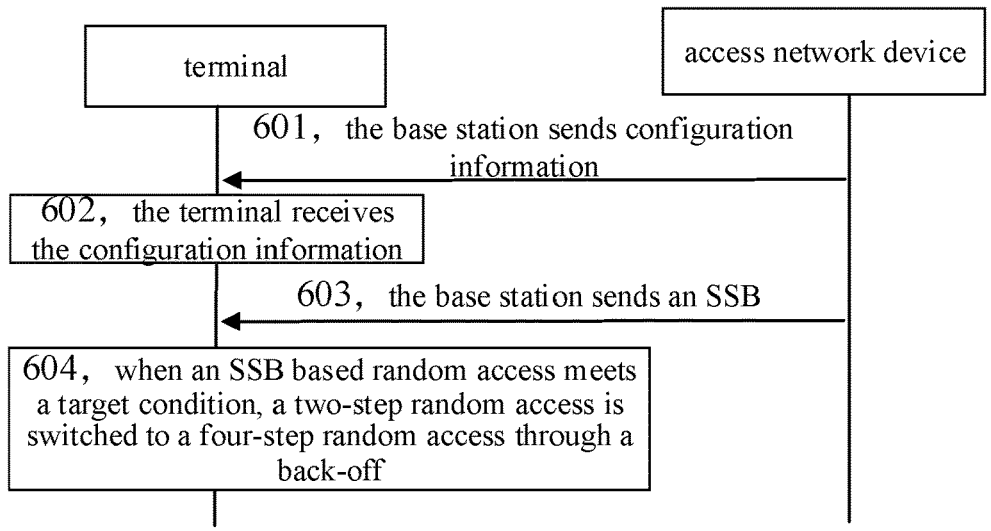
FIG. 6 is a flowchart illustrating a random access method according to a still embodiment.

FIG. 6 is a flowchart illustrating a random access method according to a still embodiment. The method can be performed by the terminal and the base station illustrated in FIG. 1. The method may include the following.

At block 601, the base station sends configuration information.

The configuration information is configured to indicate to enable a back-off function of a random access process.

At block 602, the terminal receives the configuration information.

The configuration information is configured to indicate to enable a back-off function of a random access process.

At block 603, the base station sends an SSB.

At block 604, when an SSB based random access meets a target condition, a two-step random access is switched to a four-step random access through a back-off.

According to the method provided in the embodiment, by switching a two-step random access to a four-step random access through a back-off in response to an SSB based random access meeting a target condition, the four-step random access may be used when the two-step random access has a low success rate, so as to improve the success rate, in particularly in the FR2 frequency band, such that an access success rate of the UE can be ensured.

Figure 7:
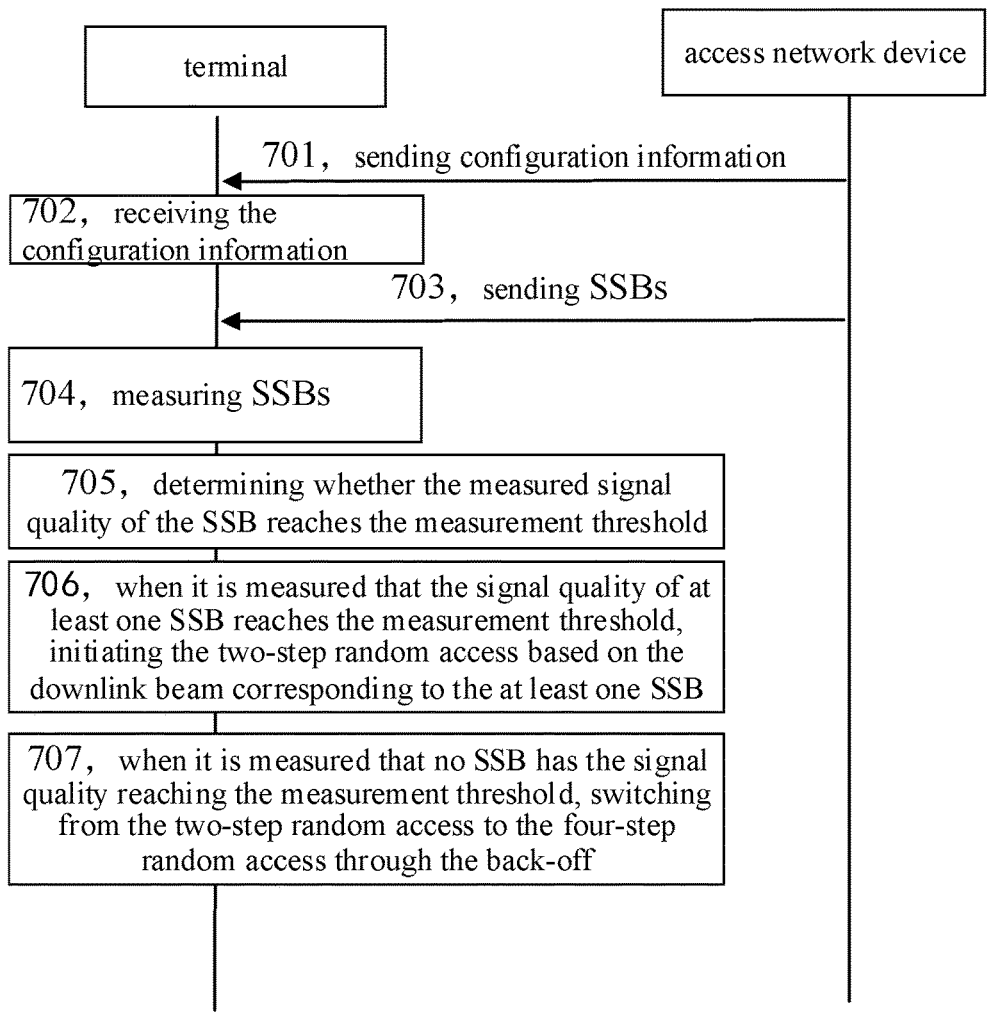
FIG. 7 is a flowchart illustrating a random access method according to a still embodiment.

FIG. 7 is a flowchart illustrating a random access method according to a still embodiment. The method can be performed by the terminal and the base station illustrated in FIG. 1. The method may include the following.

At block 701, the base station sends configuration information.

The configuration information is first configuration information or second configuration information.

For example, the base station sends the first configuration information, and the first configuration information is configured to configure a measurement threshold which is a threshold configured to measure a signal quality of the SSB. In addition, the measurement threshold is further configured to implicitly indicate to enable the back-off function of the random access process.

For example, the base station sends the second configuration information, and the second configuration information is configured to configure a measurement threshold and an enable indication. The enable indication is configured to indicate to enable the back-off function of the random access process. In one example, the enable indication is one bit, when the value of the bit is "1", the bit is used as the enable indication. When the value of the bit is "0", the bit is used as a disable indication.

At block 702, the terminal receives the configuration information.

Correspondingly, the terminal receives the first configuration information, obtains the measurement threshold based on the first configuration information and enables the back-off function of the random access process.

Correspondingly, the terminal receives the second configuration information, obtains the measurement threshold and the enable indication based on the second configuration information and enables the back-off function of the random access process based on the enable indication.

At block 703, the base station sends the SSBs.

The base station sends the SSBs to the UE by using multiple downlink beams.

At block 704, the terminal measures the SSBs.

The UE measures the SSBs sent by the base station. The same UE may measure one or more SSBs, and each SSB corresponds to a respective downlink beam.

For example, the UE may measure the SSB1 sent on the downlink beam 1, and may also measure the SSB2 sent on the downlink beam 2.

For each SSB, the UE measures the signal quality corresponding to the SSB.

At block 705, the terminal determines whether the measured signal quality of the SSB reaches the measurement threshold.

For the signal quality of each SSB, the UE determines whether the signal quality of the SSB reaches the measurement threshold, i.e., whether it is greater than the measurement threshold. The measurement threshold is predefined, or configured by a high layer. The high layer refers to a layer above the physical layer.

If the signal quality of at least one SSB reaches the measurement threshold, a step at block 706 is executed. If no SSB has the signal quality reaching the measurement threshold, a step at block 707 is executed.

At block 706, when it is measured that the signal quality of at least one SSB reaches the measurement threshold, the terminal initiates the two-step random access based on the downlink beam corresponding to the at least one SSB.

When the signal quality of one SSB X reaches the measurement threshold, the two-step random access is initiated based on the downlink beam corresponding to the SSB X. That is, the UE determines the uplink beam x2 and the random access resource used by the two-step random access based on the downlink beam x1 corresponding to the SSB X. The UE sends the message A in the two-step random access to the base station.

When the signal qualities of at least two SSBs reach the measurement threshold, the SSB having the best signal quality is determined (or any one SSB with the signal quality reaching the measurement threshold is selected randomly), and the two-step random access is initiated based on the downlink beam corresponding to the SSB having the best signal quality.

At block 707, when it is measured that no SSB has the signal quality reaching the measurement threshold, the terminal may switches from the two-step random access to the four-step random access through the back-off.

The UE determines the SSB having the best signal quality (or selects randomly any one SSB), and the four-step random access is initiated based on the downlink beam corresponding to the SSB having the best signal quality.

According to the method provided in the embodiment, when the SSB has a good signal quality, the two-step random access may be used, and when the SSB has a poor signal quality, the four-step random access may be used. Since the message 1 of the four-step random access has a better demodulation performance, a better random access success rate may be achieved even when the SSB has the poor signal quality.

Figure 8:
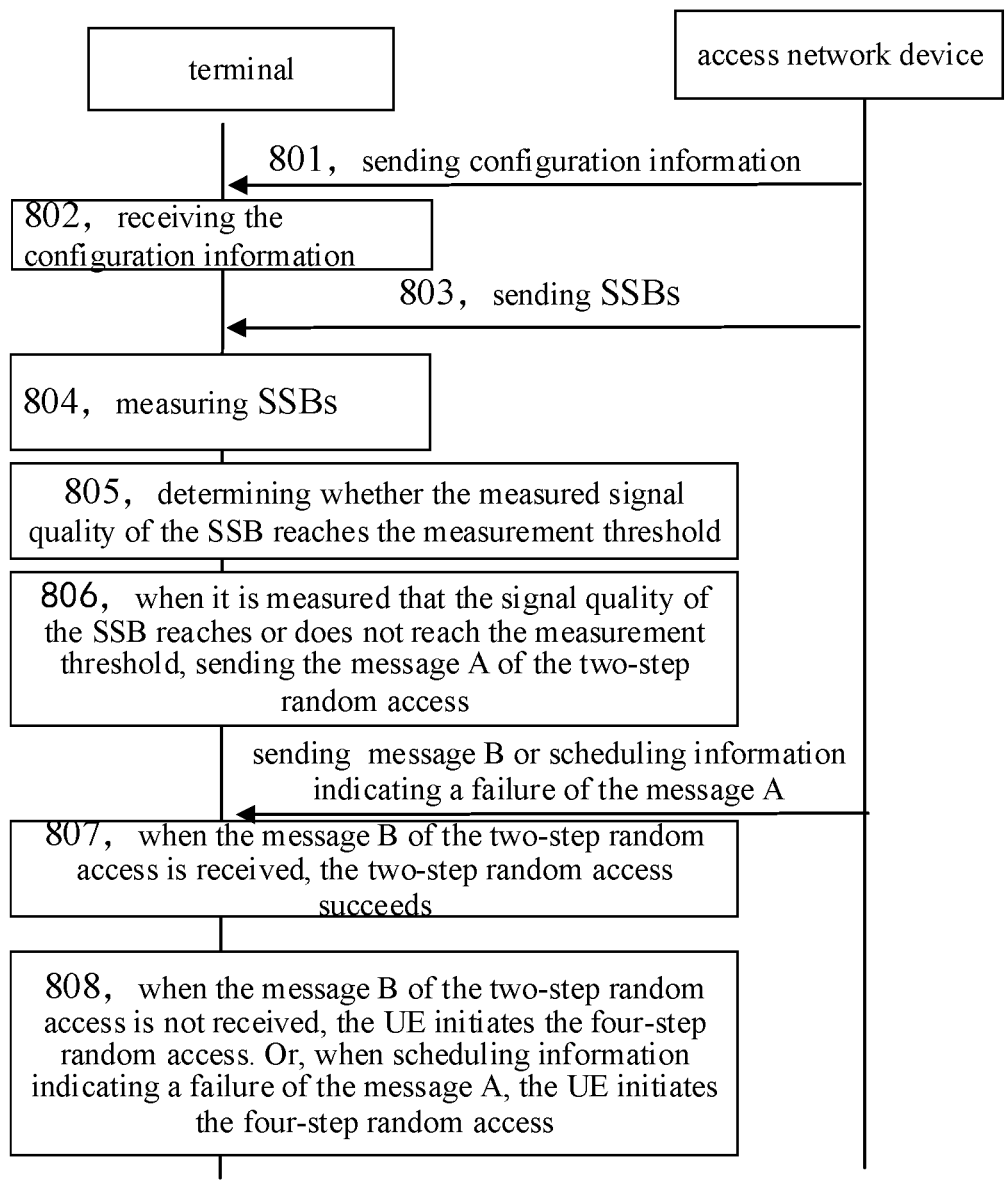
FIG. 8 is a flowchart illustrating a random access method according to a still embodiment.

FIG. 8 is a flowchart illustrating a random access method according to a still embodiment. The method can be performed by the terminal and the base station illustrated in FIG. 1. The method may include the following.

At block 801, the base station sends configuration information.

The configuration information is any of first configuration information, second configuration information and third configuration information.

For example, the base station sends the first configuration information, and the first configuration information is configured to configure a measurement threshold which is a threshold configured to measure a signal quality of the SSB. In addition, the measurement threshold is further configured to implicitly indicate to enable the back-off function of the random access process.

For example, the base station sends the second configuration information, and the second configuration information is configured to configure a measurement threshold and an enable indication. The enable indication is configured to indicate to enable the back-off function of the random access process. In one example, the enable indication is one bit, when the value of the bit is "1", the bit is used as the enable indication. When the value of the bit is "0", the bit is used as a disable indication.

For example, the base station sends the third configuration information, and the third configuration information is configured to configure an enable indication. The enable indication is configured to indicate to enable the back-off function of the random access process. In one example, the enable indication is one bit, when the value of the bit is "1", the bit is used as the enable indication. When the value of the bit is "0", the bit is used as a disable indication.

At block 802, the terminal receives the configuration information.

Correspondingly, the terminal receives the first configuration information, obtains the measurement threshold based on the first configuration information and enables the back-off function of the random access process.

Correspondingly, the terminal receives the second configuration information, obtains the measurement threshold and the enable indication based on the second configuration information and enables the back-off function of the random access process based on the enable indication.

Correspondingly, the terminal receives the third configuration information, obtains the enable indication based on the third configuration information and enables the back-off function of the random access process based on the enable indication.

At block 803, the base station sends the SSBs.

At block 804, the terminal measures the SSBs.

The base station sends the SSBs to the UE by using multiple downlink beams. The UE measures the SSBs sent by the base station. The same UE may measure one or more SSBs, and each SSB corresponds to a respective downlink beam.

For example, the UE may measure the SSB1 sent on the downlink beam 1, and may also measure the SSB2 sent on the downlink beam 2.

For each SSB, the UE measures the signal quality corresponding to the SSB.

At block 805, the terminal determines whether the measured signal quality of the SSB reaches the measurement threshold.

For the signal quality of each SSB, the UE determines whether the signal quality of the SSB reaches the measurement threshold, i.e., whether it is greater than the measurement threshold. The measurement threshold is predefined, or configured by a high layer. The high layer refers to a layer above the physical layer.

Regardless of whether there is the SSB has the signal quality reaching the measurement threshold, a step at block 806 is executed.

It should be noted that, when the base station sends the third configuration information, i.e., the base station does not configure the measurement threshold for the UE, the UE determines directly the corresponding uplink beam and the random access resource based on the downlink beam corresponding to the SSB having the best signal quality after measuring the SSBs, and sends the message A of the two-step random access based on the random access resource, without comparing the signal quality of the SSB with the measurement threshold.

At block 806, when it is measured that the signal quality of the SSB reaches or does not reach the measurement threshold, the message A of the two-step random access is sent.

For example, the UE determines the SSB having the best signal quality (or selects randomly any one SSB with the signal quality reaching the measurement threshold), determines the corresponding uplink beam and the random access resource based on the downlink beam corresponding to the SSB having the best signal quality, and initiates the two-step random access based on the random access resource, i.e., sending the message A of the two-step random access.

At block 807, when the message B of the two-step random access is received, the two-step random access succeeds.

At block 808, when the message B of the two-step random access is not received, the UE initiates the four-step random access. Or, when scheduling information indicating a failure of the message A, the UE initiates the four-step random access.

For example, the UE determines the SSB having the best signal quality (or selects randomly any one SSB with the signal quality reaching the measurement threshold), determines the corresponding uplink beam and the random access resource based on the downlink beam corresponding to the SSB having the best signal quality, and initiates the four-step random access based on the random access resource, i.e., sending the message 1 of the four-step random access.

According to the method provided in the embodiment, the two-step random access may be used preferably, and when the two-step random access fails, the four-step random access may be used. Since the message 1 of the four-step random access has a better demodulation performance, a better random access success rate may be achieved by initiating the random access process again when the two-step random access fails.

Based on the alternative embodiment of FIG. 7 or FIG. 8, the above configuration information may be a RRC signaling, a MAC CE signaling and so on. In another example, the base station sends fourth configuration information to the UE in advance. The fourth configuration information may be configured to configure a disable indication. The disable indication is configured to indicate to disable a back-off function of the random access process. Correspondingly, the UE receives the fourth configuration information, and disables the back-off function of the random access process based on the fourth configuration information. After the back-off function is disabled, the embodiment described below with reference to FIG. 9 is implemented.

Figure 9:
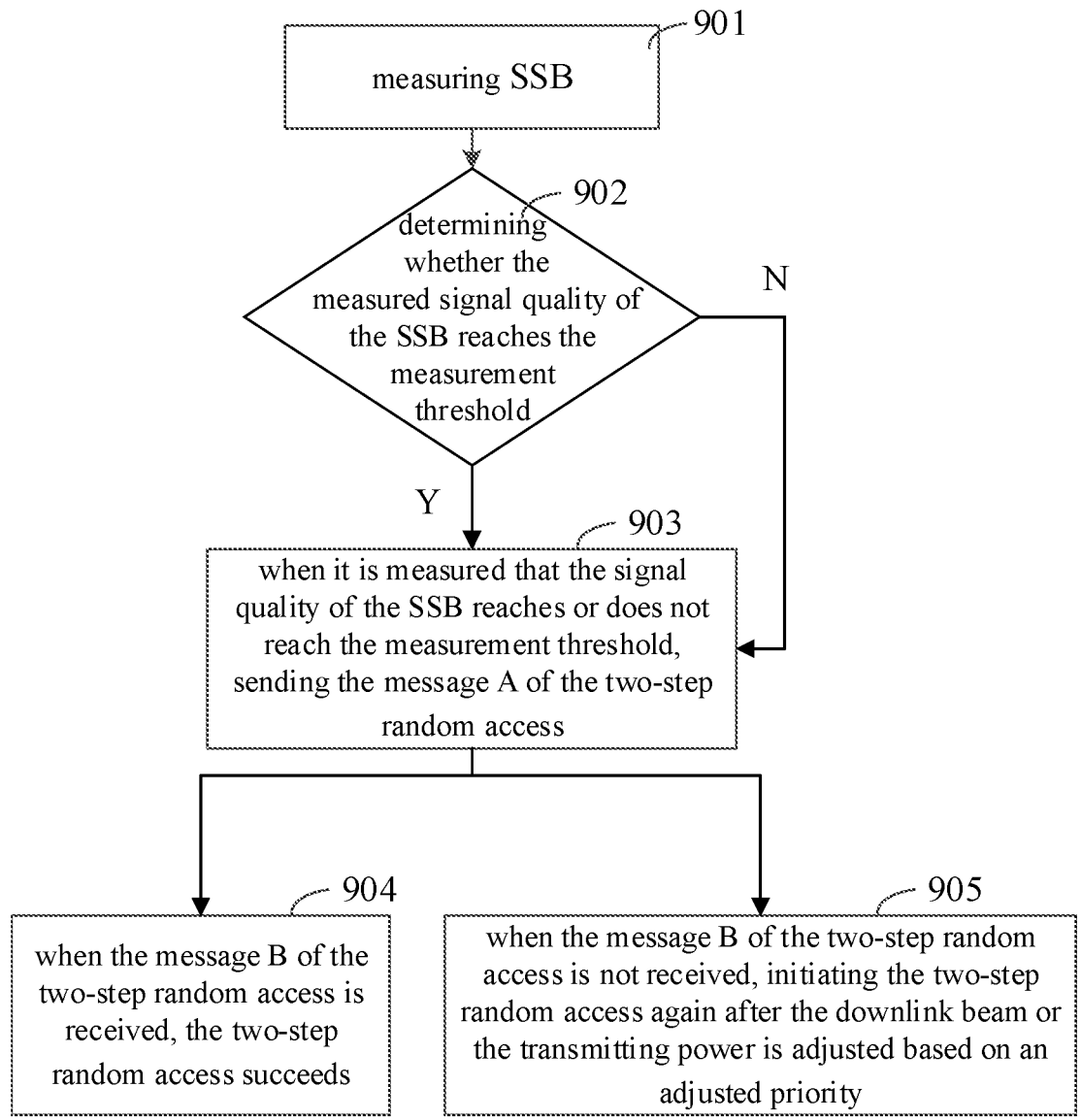
FIG. 9 is a flowchart illustrating a random access method according to a still embodiment.

FIG. 9 is a flowchart illustrating a random access method according to a still embodiment. The method can be performed by the terminal illustrated in FIG. 1. The method may include the following.

At block 901, the SSB is measured.

The base station sends the SSBs to the UE by using multiple downlink beams. The UE measures the SSBs sent by the base station. The same UE may measure one or more SSBs, and each SSB corresponds to a respective downlink beam.

For example, the UE may measure the SSB1 sent on the downlink beam 1, and may also measure the SSB2 sent on the downlink beam 2.

For each SSB, the UE measures the signal quality corresponding to the SSB.

At block 902, it is determined whether the measured signal quality of the SSB reaches the measurement threshold.

For the signal quality of each SSB, the UE determines whether the signal quality of the SSB reaches the measurement threshold, i.e., whether it is greater than the measurement threshold. The measurement threshold is predefined, or configured by a high layer. The high layer refers to a layer above the physical layer.

Regardless of whether there is the SSB has the signal quality reaching the measurement threshold, a step at block 903 is executed.

It should be noted that, if the base station does not configure the measurement threshold for the UE previously, the UE determines directly the corresponding uplink beam and the random access resource based on the downlink beam corresponding to the SSB having the best signal quality after measuring the SSBs, and sends the message A of the two-step random access based on the random access resource, without comparing the signal quality of the SSB with the measurement threshold.

At block 903, when it is measured that the signal quality of the SSB reaches or does not reach the measurement threshold, the message A of the two-step random access is sent.

At block 904, when the message B of the two-step random access is received, the two-step random access succeeds.

At block 905, when the message B of the two-step random access is not received, the two-step random access is initiated again after the downlink beam or the transmitting power is adjusted based on an adjusted priority.

The adjusted priority includes a first adjusted priority of the downlink beam being higher than a second adjusted priority of the transmitting power.

In other words, the UE replaces the first downlink beam referred this time with the second downlink beam. The first downlink beam is a downlink beam has the best signal quality, and the second downlink beam is a downlink beam has the suboptimum signal quality. The random access resource is determined based on the second downlink beam, and the two-step random access is initiated again based on the random access resource.

When the two-step random access initiated again fails, the UE determines the random access resource based on the first downlink beam again, and increases the transmitting power. The two-step random access is initiated again based on the random access resource and the increased transmitting power.

According to the method provided in the embodiment of the present disclosure, by using the two-step random access to the greatest extent, the UE may perform the random access as soon as possible, which is more suitable to a low-latency business scenario, such as ultra-reliable and low latency communications (URLLC).

The apparatus embodiments of the disclosure are described below, and the details not described in the apparatus embodiments may refer to the method embodiments.

Figure 10:
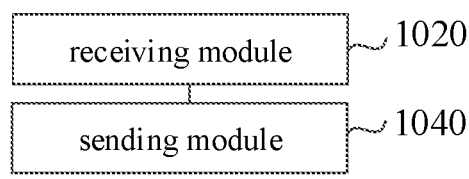
FIG. 10 is a block diagram illustrating a random access apparatus according to an embodiment.

FIG. 10 is a block diagram illustrating a random access apparatus according to an embodiment. The apparatus may be implemented as all or a part of a terminal by software, hardware (a processor, a memory, and a base band chip) or a combination thereof. The apparatus includes a receiving module 1020 and a sending module 1040.

The receiving module 1020 is configured to receive configuration information, in which the configuration information is configured to indicate to enable a back-off function of a random access process.

The sending module 1040 is configured to switch from a two-step random access to a four-step random access by a back-off in response to a synchronization signal and PBCH block (SSB) based random access meeting a target condition.

In an alternative embodiment, the sending module 1040 is configured to: switch from the two-step random access to the four-step random access by the back-off in response to detecting that no SSB has a signal quality reaching a measurement threshold.

In an alternative embodiment, the receiving module 1020 is configured to receive first configuration information, in which the first configuration information is configured to configure the measurement threshold, and the measurement threshold is configured to implicitly indicate to enable the back-off function of the random access process; or the receiving module 1020 is configured to receive second configuration information, in which the second configuration information is configured to configure the measurement threshold and an enable indication, and the enable indication is configured to indicate to enable the back-off function of the random access process.

In an alternative embodiment, the sending module 1040 is configured to: send a message A of the two-step random access in response to measuring an SSB; and initiate the four-step random access in response to not receiving a message B of the two-step random access by the receiving module 1020, or initiate the four-step random access in response to receiving scheduling information indicating a failure of the message A.

In an alternative embodiment, the receiving module 1020 is configured to: receive third configuration information, in which the third configuration information is configured to configure an enable indication, and the enable indication is configured to indicate to enable the back-off function of the random access process.

In an alternative embodiment, the receiving module 1020 is configured to: receive fourth configuration information, in which the fourth configuration information is configured to configure a disable indication, and the disable indication is configured to indicate to disable the back-off function of the random access process.

In an alternative embodiment, the sending module 1040 is configured to: send a message A of the two-step random access in response to measuring an SSB; and initiate the two-step random access again after adjusting a downlink beam or transmitting power based on an adjusted priority in response to not receiving a message B of the two-step random access by the receiving module 1020.

The adjusted priority includes a first adjusted priority of the downlink beam being higher than a second adjusted priority of the transmitting power.

Figure 11:
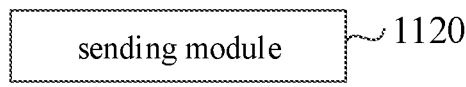
FIG. 11 is a block diagram illustrating a random access apparatus according to an embodiment.

FIG. 11 is a block diagram illustrating a random access apparatus according to an embodiment. The apparatus may be implemented as all or a part of a terminal by software, hardware (a processor, a memory, and a base band chip) or a combination thereof. The apparatus includes a sending module 1120.

The sending module 1120 is configured to send configuration information, in which the configuration information is configured to indicate to enable a back-off function of a random access process; and send a synchronization signal and PBCH block (SSB), in which the SSB is configured to trigger a UE to switch from a two-step random access to a four-step random access by a back-off in response to a SSB based random access meeting a target condition.

In an alternative embodiment, the sending module 1120 is configured to send first configuration information, in which the first configuration information is configured to configure a measurement threshold, and the measurement threshold is configured to implicitly indicate to enable the back-off function of the random access process; or the sending module 1120 is configured to send second configuration information, in which the second configuration information is configured to configure a measurement threshold and an enable indication, and the enable indication is configured to indicate to enable the back-off function of the random access process; or the sending module 1120 is configured to send third configuration information, in which the third configuration information is configured to configure an enable indication, and the enable indication is configured to indicate to enable the back-off function of the random access process.

In an alternative embodiment, the sending module 1120 is configured to send fourth configuration information, in which the fourth configuration information is configured to configure a disable indication, and the disable indication is configured to indicate to disable the back-off function of the random access process.

It should be noted that, the above receiving module may be implemented by executing codes with a receiver, and the above sending module may be implemented by executing codes with a sender. And other modules may be implemented by executing codes with a processor.

Figure 12:
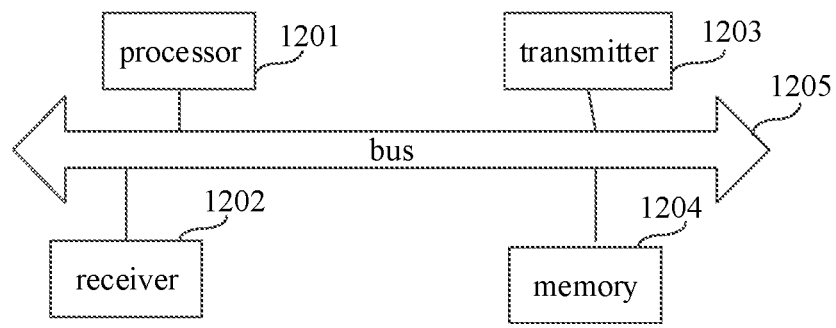
FIG. 12 is a block diagram illustrating a terminal according to an embodiment.

FIG. 12 is a schematic diagram of a terminal according to an embodiment of the disclosure. The terminal includes: a processor 1201, a receiver 1202, a transmitter 1203, a memory 1204, and a bus 1205.

The processor 1201 includes one or more processing cores, and the processor 1201 executes various functional applications and information processing by running software programs and modules.

The receiver 1202 and the transmitter 1203 may be implemented as a communication component, which may be a communication chip.

The memory 1204 is connected to the processor 1201 through the bus 1205.

The memory 1204 may be configured to store at least one instruction, and the processor 1201 may be configured to execute the at least one instruction to implement various steps in the above method embodiments.

Additionally, the memory 1204 may be implemented by any type or combination of volatile or non-volatile storage devices including, but not limited to, magnetic or optical disks, electrically erasable programmable Read Only Memory (EEPROM), Erasable Programmable Read Only Memory (EPROM), Static Anytime Access Memory (SRAM), Read Only Memory (ROM), Magnetic Memory, Flash Memory, Programmable Read Only Memory (PROM).

In an embodiment, a non-transitory computer-readable storage medium including instructions, such as a memory including instructions, is also provided. The instructions are executable by a processor of a terminal to perform the above method. For example, the non-transitory computer-readable storage medium may be ROM, random access memory (RAM), CD-ROM, magnetic tape, floppy disk, optical data storage device, and the like.

A non-transitory computer-readable storage medium is provided, when the instructions in the non-transitory computer storage medium are executed by a processor of a terminal, the terminal is caused to execute the above method.

An embodiment of the present disclosure further provides a computer-readable storage medium, in which at least one instruction, at least one piece of program, a code set or an instruction set is stored in the computer-readable storage medium, the at least one instruction, the At least one piece of program, the code set or the instruction set is loaded and executed by the processor to implement the methods provided by the above-mentioned various method embodiments.

Figure 13:
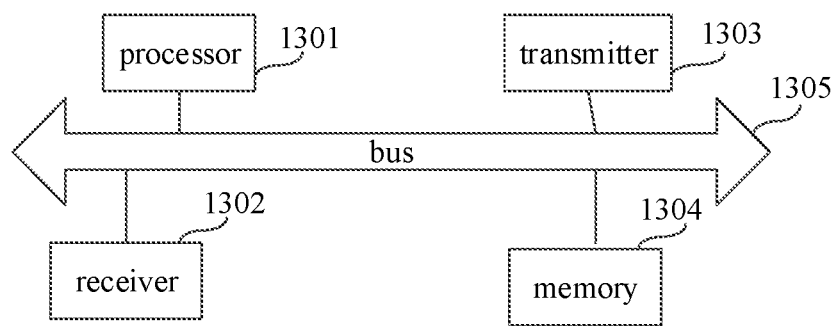
FIG. 13 is a block diagram illustrating an access network device according to an embodiment.

FIG. 13 is a schematic diagram of a terminal according to an embodiment of the disclosure. The terminal includes: a processor 1301, a receiver 1302, a transmitter 1303, a memory 1304, and a bus 1305.

The processor 1301 includes one or more processing cores, and the processor 1301 executes various functional applications and information processing by running software programs and modules.

The receiver 1302 and the transmitter 1303 may be implemented as a communication component, which may be a communication chip.

The memory 1304 is connected to the processor 1301 through the bus 1305.

The memory 134 may be configured to store at least one instruction, and the processor 1301 may be configured to execute the at least one instruction to implement various steps in the above method embodiments.

Additionally, the memory 1304 may be implemented by any type or combination of volatile or non-volatile storage devices including, but not limited to, magnetic or optical disks, electrically erasable programmable Read Only Memory (EEPROM), Erasable Programmable Read Only Memory (EPROM), Static Anytime Access Memory (SRAM), Read Only Memory (ROM), Magnetic Memory, Flash Memory, Programmable Read Only Memory (PROM).

In an embodiment, a non-transitory computer-readable storage medium including instructions, such as a memory including instructions, is also provided. The instructions are executable by a processor of a terminal to perform the above method. For example, the non-transitory computer-readable storage medium may be ROM, random access memory (RAM), CD-ROM, magnetic tape, floppy disk, optical data storage device, and the like.

A non-transitory computer-readable storage medium is provided, when the instructions in the non-transitory computer storage medium are executed by a processor of a terminal, the terminal is caused to execute the above method.

It should be understood that references herein to "a plurality" means two or more. "And/or", which describes the association relationship of the associated objects, means that there can be three kinds of relationships, for example, A and/or B, which can mean that A exists alone, A and B exist at the same time, and B exists alone. The character "/" generally indicates that the associated objects are an "or" relationship.

Other embodiments of the present disclosure will readily occur to those skilled in the art upon consideration of the specification and practice of the invention disclosed herein. This disclosure is intended to cover any variations, uses, or adaptations of this disclosure that follow the general principles of this disclosure and include common general knowledge or techniques in the technical field not disclosed by this disclosure. The specification and examples are to be regarded as exemplary only, with the true scope and spirit of the disclosure being indicated by the following claims.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A random access method, comprising:
    receiving configuration information, wherein the configuration information is configured to indicate to enable a back-off function of a random access process; and
    switching from a two-step random access to a four-step random access by a back-off in response to a synchronization signal and PBCH block (SSB) based random access meeting a target condition;
    receiving another configuration information, wherein the another configuration information is configured to configure a disable indication, wherein the disable indication is configured to indicate to disable the back-off function of the random access process;
    sending a message A of the two-step random access in response to measuring an SSB; and
    initiating the two-step random access again after adjusting a downlink beam or transmitting power based on an adjusted priority in response to not receiving a message B of the two-step random access;
    wherein the adjusted priority includes a first adjusted priority of the downlink beam being higher than a second adjusted priority of the transmitting power;
    wherein initiating the two-step random access again after adjusting the downlink beam or transmitting power based on the adjusted priority in response to not receiving the message B of the two-step random access comprises:
changing the downlink beam to a new downlink beam with a signal quality inferior to that of the downlink beam and initiating the two-step random access again according to a first random access resource determined based on the new downlink beam; and
in response to the two-step random access initiated again failing, determining a second random access resource based on the downlink beam and increasing the transmitting power to a new transmitting power, and initiating the two-step random access again according to the second random access resource and the new transmitting power.

2. The method of claim 1, wherein switching from the two-step random access to the four-step random access by the back-off in response to the SSB based random access meeting the target condition comprises:
switching from the two-step random access to the four-step random access by the back-off in response to detecting that no SSB has a signal quality reaching a measurement threshold.

3. The method of claim 2, wherein the configuration information is configured to configure the measurement threshold, which configured to indicate to enable the back-off function of the random access process.

4. The method of claim 2, wherein the configuration information is configured to configure the measurement threshold and an enable indication, and the enable indication is configured to indicate to enable the back-off function of the random access process.

5. The method of claim 1, wherein switching from the two-step random access to the four-step random access by the back-off in response to the SSB based random access meeting the target condition comprises:
sending a message A of the two-step random access in response to measuring an SSB; and
initiating the four-step random access in response to not receiving a message B of the two-step random access, or initiating the four-step random access in response to receiving scheduling information indicating a failure of the message A.

6. The method of claim 5, wherein the configuration information is configured to configure an enable indication, which configured to indicate to enable the back-off function of the random access process.

7. A random access method, comprising:
sending configuration information, wherein the configuration information is configured to indicate to enable a back-off function of a random access process; and
sending a synchronization signal and PBCH block (SSB), wherein the SSB is configured to trigger a UE to switch from a two-step random access to a four-step random access by a back-off in response to a SSB based random access meeting a target condition; and
sending another configuration information, wherein the another configuration information is configured to configure a disable indication, wherein the disable indication is configured to indicate to disable the back-off function of the random access process, and the another configuration information is configured to trigger the UE to adjust a downlink beam or transmitting power based on an adjusted priority in response to not receiving a message B of the two-step random access and to initiate the two-step random access again; wherein the adjusted priority includes a first adjusted priority of the downlink beam being higher than a second adjusted priority of the transmitting power;
wherein the UE is triggered to adjust a downlink beam or transmitting power based on an adjusted priority in response to not receiving a message B of the two-step random access and to initiate the two-step random access again by:
changing the downlink beam to a new downlink beam with a signal quality inferior to that of the downlink beam and initiating the two-step random access again according to a first random access resource determined based on the new downlink beam; and
in response to the two-step random access initiated again failing, determining a second random access resource based on the downlink beam and increasing the transmitting power to a new transmitting power, and initiating the two-step random access again according to the second random access resource and the new transmitting power.

8. The method of claim 7, wherein the configuration information is configured to configure a measurement threshold, which configured to indicate to enable the back-off function of the random access process.

9. The method of claim 7, wherein the configuration information is configured to configure a measurement threshold and an enable indication, and the enable indication is configured to indicate to enable the back-off function of the random access process.

10. The method of claim 7, wherein the configuration information is configured to configure an enable indication, and the enable indication is configured to indicate to enable the back-off function of the random access process.

11. A terminal, comprising:
a processor;
a memory storing executable instructions thereon; wherein,
the processor is configured to load and execute the executable instructions to perform a random access method comprising:
receiving configuration information, wherein the configuration information is configured to indicate to enable a back-off function of a random access process; and
switching from a two-step random access to a four-step random access by a back-off in response to a synchronization signal and PBCH block (SSB) based random access meeting a target condition;
receiving another configuration information, wherein the another configuration information is configured to configure a disable indication, wherein the disable indication is configured to indicate to disable the back-off function of the random access process;
sending a message A of the two-step random access in response to measuring an SSB; and
initiating the two-step random access again after adjusting a downlink beam or transmitting power based on an adjusted priority in response to not receiving a message B of the two-step random access;
wherein the adjusted priority includes a first adjusted priority of the downlink beam being higher than a second adjusted priority of the transmitting power;
wherein initiating the two-step random access again after adjusting the downlink beam or transmitting power based on the adjusted priority in response to not receiving the message B of the two-step random access comprises:
changing the downlink beam to a new downlink beam with a signal quality inferior to that of the downlink beam and initiating the two-step random access again according to a first random access resource determined based on the new downlink beam; and in response to the two-step random access initiated again failing, determining a second random access resource based on the downlink beam and increasing the transmitting power to a new transmitting power, and initiating the two-step random access again according to the second random access resource and the new transmitting power.

12. The terminal of claim 11, wherein switching from the two-step random access to the four-step random access by the back-off in response to the SSB based random access meeting the target condition comprises:

switching from the two-step random access to the four-step random access by the back-off in response to detecting that no SSB has a signal quality reaching a measurement threshold.

13. The terminal of claim 12, wherein the configuration information is configured to configure the measurement threshold, and the measurement threshold is configured to implicitly indicate to enable the back-off function of the random access process.

14. The terminal of claim 12, wherein the configuration information is configured to configure the measurement threshold and an enable indication, and the enable indication is configured to indicate to enable the back-off function of the random access process.

15. The terminal of claim 11, wherein switching from the two-step random access to the four-step random access by the back-off in response to the SSB based random access meeting the target condition comprises:

sending a message A of the two-step random access in response to measuring an SSB; and initiating the four-step random access in response to not receiving a message B of the two-step random access, or initiating the four-step random access in response to receiving scheduling information indicating a failure of the message A.

16. The terminal of claim 15, wherein the configuration information is configured to configure an enable indication, and the enable indication is configured to indicate to enable the back-off function of the random access process.

17. An access network device, comprising:

a processor;

a memory storing executable instructions thereon; wherein, the processor is configured to perform the random access method according to claim 7.

* * * * *